United States Patent [19]

Shoji et al.

[11] Patent Number: 5,219,651

[45] Date of Patent: Jun. 15, 1993

[54] MAGNETIC RECORDING APPARATUS COMPRISING A MAGNETIC RECORDING MEDIUM AND A MAGNETIC HEAD EACH COATED WITH A COATING OF A BINDER AND A SPECIFIED FLUOROLUBRICANT

[75] Inventors: Mitsuyosi Shoji, Ibaraki; Takayuki Nakakawaji, Hitachi; Yutaka Ito, Takahagi; Shigeki Komatsuzaki, Mito; Fumio Nakano, Hitachi, all of Japan

[73] Assignee: Hitachi, Ltd., Tokyo, Japan

[21] Appl. No.: 790,084

[22] Filed: Nov. 13, 1991

Related U.S. Application Data

[63] Continuation-in-part of Ser. No. 353,476, May 17, 1989, abandoned.

[30] Foreign Application Priority Data

May 17, 1988 [JP] Japan .................. 63-118127

[51] Int. Cl.$^5$ .................................................. G11B 5/00
[52] U.S. Cl. ....................................... 428/323; 428/64; 428/336; 428/694 BF; 428/900; 360/88
[58] Field of Search ............... 428/64, 323, 336, 694, 428/695, 900; 360/122, 88, 90, 97.01, 134, 135

[56] References Cited

U.S. PATENT DOCUMENTS

| | | | |
|---|---|---|---|
| 3,860,449 | 1/1975 | Akashi et al. | 117/235 |
| 4,556,604 | 12/1985 | Ohbayashi et al. | 428/323 |
| 4,610,930 | 9/1986 | Masuda et al. | 428/694 |
| 4,649,448 | 3/1987 | Nakajima | 360/122 |
| 4,666,754 | 5/1987 | Arioka et al. | 428/141 |
| 4,696,845 | 9/1987 | Yanagisawa | 428/64 |
| 4,729,924 | 3/1988 | Skorjanec et al. | 428/422 |
| 4,746,559 | 5/1988 | Nishikawa et al. | 428/142 |
| 4,757,145 | 7/1988 | Caporiccio et al. | 546/81 |
| 4,797,321 | 1/1989 | Funahashi et al. | 428/328 |

Primary Examiner—Paul J. Thibodeau
Assistant Examiner—Stevan A. Resan
Attorney, Agent, or Firm—Antonelli, Terry Stout & Kraus

[57] ABSTRACT

A magnetic recording medium which comprises a non-magnetic substrate, a thin film magnetic layer formed on the surface of the substrate and an organic thin film protective layer formed on the magnetic layer, the organic thin film protective layer having a thickness of not more than 100 nm and containing a filler having a particle size of not more than 50 nm, wherein the surface of the organic thin film protective layer is further coated with a fluorine-based compound represented by the following general formula:

$$F(C_3F_6-I-)_x-C_2F_4-,$$

$$F(C_3F_6-O-)_x-(CF_2O)_y-(CF_2)_z-\text{ or}$$

$$-(C_2F_4-O-)_y-(CF_2-CF_2-$$

, wherein x, y and z are integers of 1 or more, and a magnetic head whose surface is coated with a lubricant thin film having the same composition as that of the above organic thin film protective layer have an excellent sliding durability, and a magnetic recording apparatus using these magnetic recording medium and magnetic head has a high reliability.

3 Claims, 1 Drawing Sheet

MAGNETIC RECORDING APPARATUS COMPRISING A MAGNETIC RECORDING MEDIUM AND A MAGNETIC HEAD EACH COATED WITH A COATING OF A BINDER AND A SPECIFIED FLUOROLUBRICANT

CROSS REFERENCE TO RELATED APPLICATION:

This application is a continuation-in-part of application, Ser. No. 353,476, filed May 17, 1989 now abandoned.

BACKGROUND OF THE INVENTION

This invention relates to a magnetic recording medium, a magnetic head and a magnetic recording apparatus using the medium and the head, and particularly to a magnetic recording medium and a magnetic head having a protective film with a good durability on their respective surfaces and a highly reliable magnetic recording apparatus using the medium and the head.

Magnetic disks are applied to many fields of information memory and reproduction apparatuses of large capacity. All of these magnetic disks are required to have an increased recording capacity and a reliability that can withstand prolonged operations. A magnetic fields requiring a high recording density. However, magnetic recording density is applied particularly to disks requiring a high recording density. However, in case of the thin film magnetic medium type, an increase in the memory capacity inevitably makes sliding conditions severer, for example, a narrower clearance between the head and the disk, the resulting higher probability of contact sliding, etc. Thus, an increase in the sliding durability is indispensable. No magnetic disks of thin film magnetic medium type having a sufficient durability have been produced up to now.

One procedure now available to improve the durability is to decrease the friction and wearing during the sliding by use of a lubricant. It has been proposed to coat the surface of a magnetic disk only with a fluorine-based lubricant having a distinguished lubricating ability (Krytox 143, trademark of a product made by E.I. DuPont; Homblin Y, trademark of a product made by Monte-Fluous), as disclosed in U.S. Pat. Nos. 3,490,946 and 3,778,308. This procedure is very effective at the initial stage. However, when such a disk is used for a long time, the lubricant is gradually peeled off from the disk surface to decrease the lubricating effect, because the disk turns at a high speed.

It has been also proposed to coat the surface of a magnetic disk with a fluorine-based surfactant having a high adsorptivity, as disclosed in Japanese Patent Application Kokai (Laid-open) Nos. 59-116931, 58-41431, 58-29147, 57-154619 and 57-44226. Furthermore, it has been also proposed to chemically fix a fluorine-based lubricant to the surface of a magnetic disk as disclosed in U.S. Pat. No. 4,120,995 and Japanese Patent Application Kokai (Laid-open) Nos. 54-36171, 59-20323, 60-38730, 59-172159 and 61-39919.

Such fluorine-based surfactants and lubricants include compounds represented by the following general formula:

$$C_nF_{2n+1}-SiZ_3$$

wherein n=4 to 13 and X is a halogen atom, a nitrile group or an alkoxy group, and phosphoric acid-based compounds represented by the following general formula:

$$R_f-P(O)-(OR)_m$$

wherein $R_f$ is a perfluoroalkyl group, R is $C_zH_{2z+1}$, m is 2 to 3 and Z is 0 to 3, as disclosed in Japanese Patent Application Kokai (Laid-open) Nos. 60-109028, 60-101717 and 60-246020. These lubricants are of such a type that the lubricants are fixed to a metal film or an oxide film on the surface of a disk by reaction therewith.

In the coating of the surface of a magnetic disk with the fluorine-based surfactants represented by the foregoing general formalae, the fluorine-based surfactants are not strongly fixed to the surface of the disk, and the surfactants are readily disengaged from the sliding surface during the sliding operation. Thus, the durability of a magnetic disk is not satisfactorily improved and also the durability of a recording apparatus is not improved.

In the procedures disclosed in U.S. Pat. No. 4,120,995 and Japanese Patent Application Kokai (Laid-open) Nos. 54-36171, 59-203239, 60-38730, 59-172159 and 61-39919, the lubricant is fixed to the surface of a magnetic disk by chemical reaction. Consequently, the lubricant is hard to disengage from the sliding surface and a considerable improvement in the durability is expectable. However, it is hard to conduct the reaction and also to obtain a homogeneous film as a reaction product. Thus, it is quite hard to use these procedures in actual practice. Furthermore, the fluorine chains are too short. For example, with a chain length of less than 12 carbon atoms, a good lubricating effect cannot be obtained, and the durability of the magnetic recording medium is not satisfactorily improved. The conventional fluorine-based surfactants and lubricants do not greatly improve the durability of a magnetic disk and it is less practical to chemically bond a fluorine-based lubricant to the surface.

SUMMARY OF THE INVENTION

An object of the invention is to provide a magnetic recording medium, a magnetic head and a magnetic recording apparatus, free from the disadvantages of the prior art.

According to a first aspect of the present invention, a magnetic recording medium is provided. This medium comprises a non-magnetic substrate, a thin film magnetic layer formed on the substrate and an organic thin film protective layer formed on the magnetic layer, the organic thin film protective layer having a thickness of not more than 100 nm and containing a filler having a particle size of not more than 50 nm.

According to a second aspect of the present invention, there is provided another magnetic recording medium, which further comprises a surface of the organic thin film protective layer of the foregoing magnetic recording medium being coated with a fluorine-based compound represented by the following general formula:

$$F(C_3F_6-I-)_x-C_2F_4-,$$

$$F(C_3F_6-O-)_x-(CF_2O)_y-(CF_2)_z-\text{or}$$

$$-(C_2F_4-O-)_y-(CF_2-CF_2-$$

wherein X, Y and Z are integers of 1 or more.

According to a third aspect of the present invention, a magnetic head is provided, which comprises a magnetic head and a lubricant thin film formed on the surface thereof According to a fourth aspect of the present invention, a magnetic recording apparatus is provided, which comprises a magnetic recording medium of the foregoing first or second aspect and a magnetic head of magnetic head of the foregoing third aspect in combination.

According to the present invention, an organic thin film protective layer of not more than 100 nm is formed on the surface of a magnetic disk. In order to give a high reliability to the organic thin film protective layer, the organic thin film protective layer contains a filler, particularly an inorganic filler, having a particle size of not more than 50 nm. By further forming a thin film containing a lubricant on the surface of the organic thin film protective layer on the magnetic head side, a magnetic recording apparatus having a higher reliability can be obtained.

The present invention will be described in detail hereinafter.

In the present invention, in order to protect a magnetic head and a magnetic recording medium from crashes caused by sliding between the magnetic head and the magnetic recording medium, an organic thin film protective layer having a thickness of not more than 100 nm is formed on the surface of a magnetic layer, and a fluorine-based compound or a compound having a perfluoropolyoxyalkylene group is added as a lubricant thin film on the surface of the organic thin film protective layer or on the surface of the magnetic head. A filler having a particle size of not more than 50 nm is dispersed in the organic thin film protective layer or further in the lubricant thin film. The object of the invention can be attained thereby.

In order to increase the sliding durability of a magnetic recording medium and a magnetic head, it has been so far presumed necessary to provide a lubricant capable of decreasing the coefficient of friction and the wearing rate on the surface thereof and fluorine-based lubricants of reaction type so far proposed in the prior art have been presumed to be effective. However, the sliding durability is not sufficient and the procedure for fixing the lubricant are very difficult, and thus in the present invention, an organic thin film protective layer is formed on the surface of a magnetic recording medium, a filler, particularly an inorganic filler, having a particle size of not more than 50 nm is dispersed in the organic thin film protective layer; and a fluorine-based lubricant or a lubricant with a combined structure of perfluoropolyoxyalkylene group and non-fluorine group is added to at least one of the organic thin film protective layer and a lubricant thin film on the magnetic head surface side. A magnetic head in contact with a magnetic disk turning at a high speed and a magnetic recording medium can be protected thereby.

The inorganic filler of the present invention includes ceramics such as $Al_2O_3$, $SiO_2$, $TiO_2$, etc. Particles having a particle size of not more than 50 nm include, particles commercially available as, for example, AEROSIL-200, and AEROSIL-R974(trademarks of products made by Nihon Aerosil K.K., Japan), Aluminium Oxide C, Titanium Dioxide P25, etc.

The foregoing organic thin film contains 0.1–30%, preferably 5–20%, by weight of the inorganic filler. The inorganic filler is so fine that it is hard to prepare a thin film containing the inorganic filler as homogenously dispersed. Thus, the inorganic filler must be dispersed with various dispersing agents or by sufficient shearing.

The effective dispersing agents are those with epoxy groups or amine groups as organic functional group, such as Sila-Ace S510, S520, S530, S311, S320, S330, etc. (trademards of products made by Chisso K.K., Japan).

Since the filler is made up of very fine particles having a particle size of not more than 50 nm, it is difficult to disperse the filler homogeneously in the organic thin film protective layer. Unless the filler is not homogeneously dispersed as primary particles in the organic thin film protective layer, it is quite difficult to obtain a film of the organic thin protective layer having a thickness of not more than 100 nm. The above-mentioned dispersing agents are effective for homogeneously dispersing the filler, but fail to act as a lubricant. That is, a hard organic thin film protective layer can be formed by homogenously dispersing the filler, but its lubricating property is not satisfactory. Thus, it is necessary to use a lubricant additionally to obtain a satisfactory lubricating property.

The fluorine-based compounds for coating the organic thin film in the present invention are compounds having perfluoropolyoxy-alkyl (or -alkylene) groups, represented, for example, by the following general formula:

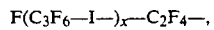

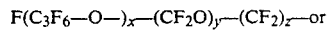

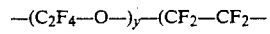

wherein x, y and z are integers of 1 or more, and preferably x is an integer of 5 or more, y is an integer of 10 to 25 and z is an integer of 10 to 56. These fluorine-based compounds include Krytox 143 commercially available from E.I. DuPont; Homblin V, Homblin Z, etc. commercially available from Monte-Fluous.

The lubricant with a combined structure of perfluoropolyoxyalkylene group and non-fluorine group to be contained in the organic thin film or the lubricant thin film on the magnetic head side is compounds represented, for example, by the following general formula:

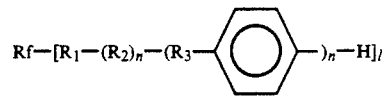

wherein Rf shows a perfluoropolyoxyalkyl group or a perfluoropolyoxyalkylene group; $R_1$ shows a direct bonding, $-CH_2-$, $-CO-$ or $-CONH-$; $R_2$ shows an oxyalkylene group having 2 or 3 carbon atoms; $R_3$ shows direct bonding, $-O-$, $-COO-$, $-CONH-$, $-NHCO-$, $-OC_pH_{2p}-$ where p is an integer of 1 or 2 or $-C(CH_3)_2-$ and $R_1$, $R_2$ and $R_3$ may differ in repetition units, and m is an integer of 0 or more, n is an integer of 1 or more, and l is an integer of 1 or 2.

The lubricant with a combined structure of perfluoropolyoxyalkylene group and non-fluorine group includes, for example, compounds represented by the following formulae:

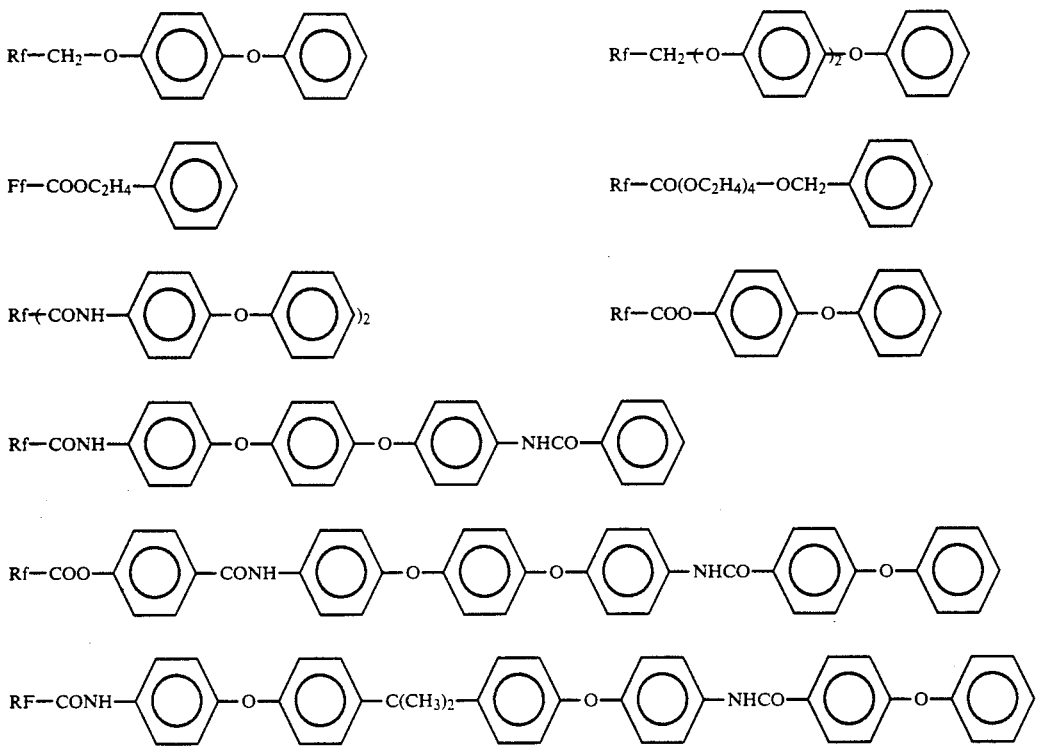

wherein Rf is F[CF(CF$_3$)—CF$_2$O—]$_n$—CF(CF$_3$)—or —[CF(CF$_3$)—CF$_2$O—]$_n$—CF(CF$_3$)—, where n is 7 to 14 on average.

The lubricant with a combined structure of perfluoropolyoxyalkylene group and non-fluorine group has a water-repellent, oil-repellent, perfluoropolyoxyalkylene group and a lyophilic, non-fluorine group, and a hydrophilic, strongly binding group which binds the perfluoropolyoxyalkylene group and the non-fluorine group, and also has a surfactant property.

The filler is made up of very fine particles and has moisture as adsorbed on the surface. The hydrophilic, strongly binding group of the lubricant adsorptively combines with the moisture on the filler surface and consequently the filler is endowed with good dispersibility.

An organic binder, which is lyophic, such as epoxy rein, phenol resin, etc. is used as a carrier for the filler. The lyophilic group of the lubricant absorptively combined with the filler has a strong affinity to the organic binder and consequently the filler can be homogeneously dispersed in the organic binder.

The lubricant thus has two functions, i.e. a property to disperse the filler homogeneously in the organic thin film protective layer and a lubricating property.

DESCRIPTION OF THE PREFERRED EMBODIMENTS

Figure 1:
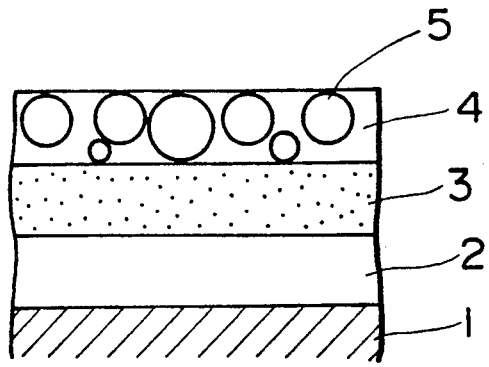
FIGS. 1 to 3 are schematic views showing a cross-sectional structure of a magnetic recording medium according to one embodiment of the present invention.

The present invention can be used in the embodiments shown in FIGS. 1 ro 4.

In FIGS. 1 to 4, numeral 1 is an Al substrate, 2 an underlayer film, 3 a magnetic thin film layer, 4 an organic thin film layer, 5 an inorganic filler, 6 a fluorine-based lubricant layer, 7 a layer containing a lubricant with a combined structure of perfluoropolyoxyalkylene group and non-fluorine group, 8 a magnetic head and 9 a lubricant thin film layer.

According to the structure of FIG. 1, an organic thin film 4 is formed on the surface of a thin film magnetic layer 3 formed on an Al substrate 1 through an underlayer film 2, and an inorganic filler 5 is dispersed in the organic thin film layer 4 to form a protective layer.

Figure 2:
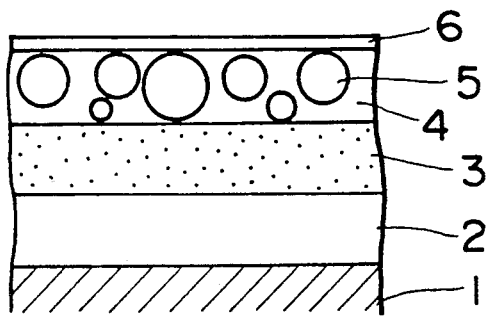

According to the structure of FIG. 2, an organic thin film layer 4 is formed on the surface of a thin film magnetic layer 3 formed on an Al substrate 1 through an underlayer film 2, an inorganic filler 5 is dispersed in the organic thin film layer 4, which is coated with a fluorine based lubricant 6, to form a protective layer.

Figure 3:
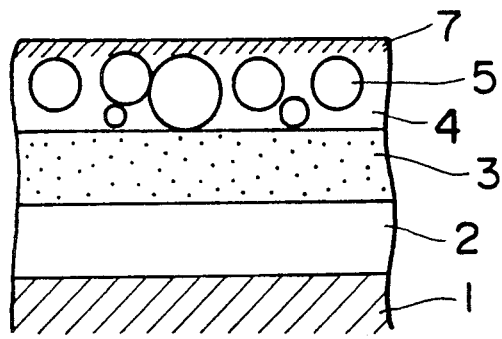

According to the structure of FIG. 3, an organic thin film layer 4 is formed on the surface of a thin film magnetic layer 3 formed on an Al substrate 1 through an interlayer film 2 and an inorganic filler 5 is dispersed in the organic thin film layer 4. A layer 7 containing a lubricant with a combined structure of perfluoropolyoxyalkylene group and non-fluorine group shown in Table 1, which follows, is formed as a surface layer of the organic thin film layer 4.

Figure 4:
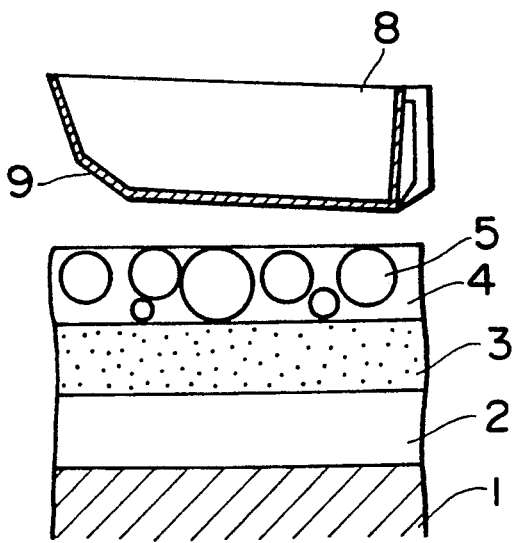
FIG. 4 is a schematic view showing a cross-sectional structure according to one embodiment of a combination of the present magnetic recording medium and magnetic head.

According to the structure of FIG. 4, an organic thin film layer 4 is formed on the surface of a thin film magnetic layer 3 formed on an Al substrate 1 through an underlayer film 2 and an inorganic filler 5 is dispersed in the organic thin film layer 4 to form a protective layer.

On the other hand, a lubricant thin film layer 9 is formed at the lower sliding surface of a magnetic head 8. The lubricant thin film layer 9 is a layer of the same lubricant with a combined structure of perfluoropolyoxyalkylene group and non-fluorine group as formed on the surface of the organic thin film layer 4.

The effects of the present invention will be described in detail below, referring to Examples, but the present invention is not limited thereto.

EXAMPLE 1

On the surface of a 5.25-inch Al alloy disk were provided a Ni-P layer and successively a Cr layer thereon. Furthermore, a Ni-Co magnetic layer was vapor deposited thereon to a thickness of 500 Å to form a disk substrate.

Separately, 4.4 g of epoxy resin (EP-1004, trademark of a product made by E.I. DuPont), 3.0 g of phenol resin (Maruka Lyncur-M, trademark of a product made by Maruzen Sekiyu Kagaku K.K., Japan) both being organic binders and 0.04 g of triethylaminotetraphenyl borate (TEA-K, trademark of a product made by Hokko Kagaku K.K. Japan) were dissolved in a solvent mixture consisting of 1,350 g of methylethylketone and 150 g of n-butylcellosolve acetate to prepare a solution [I]. Then, 0.001 g of AEROSIL-R-974 (trademark of product made by Nihon Aerosil K.K., Japan) having an average particle size of 12 mm was added to the solution [I]as an inorganic filler and the resulting mixture was stirred sufficiently in a homogenizer at 15,000 rpm for 10 minutes to prepare a solution [II].

Then, the solution [II]was applied to the disk substrate by a spin coater set to turn at 2,500 rpm to form a film to a thickness of 30 to 50 mm. After the formation of the film, the film was subjected to preheating at 80° C. for 30 minutes and then cured by heating at 230° C. for one hour, whereby a disk [1]was prepared.

The sliding durability of the thus obtained disk [1]was evaluated by a spherical slider tester. That is, the disk [1]was evaluated by applying a load of 20 g to a saphire spherical slider on the disk [1], and turning the disk under the conditions of a peripheral speed of 20 m/s, an ambient temperature of 25° C. and a relative humidity of not more than 50%, while counting the total turn number of the disk until the organic thin film was damaged.

COMPARATIVE EXAMPLE 1

As Comparative Example 1, the following disk was used. That is, the solution [I]was applied to the same disk substrate as used in Example 1 by a spin coater set to turn at 2,500 rpm to form a film to a thickness of 30-50 nm. The film was preheated at 80° C. for 30 minutes and then cured by heating at 230° C. for one hour to prepare a comparative disk [1]. The comparative disk [1]was evaluated in the same manner as in Example 1. The results of Example 1 and Comparative Example 1 are shown in Table 1.

TABLE 1

|  | Total turn number until the coated film is damaged. |
|---|---|
| Example 1 | 5,500 |
| Comparative Example 1 | 100 |

As is obvious from Table 1, a magnetic recording medium according to the present invention has a large total turn number until the organic thin film layer is damaged and thus has an excellent sliding durability, as compared with Comparative Example 1.

EXAMPLE 2

A disk [1]was prepared in the same manner as in Example 1, and then Krytox 143AC of the following formula was applied thereto:

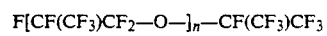

$$F[CF(CF_3)CF_2-O-]_n-CF(CF_3)CF_3$$

, wherein n is 38 on average, as a fluorine-based lubricant disclosed in U.S. Pat. No. 3,490,946 to prepare a disk [2], the sliding durability of the thus obtained disk [2]was evaluated in the same manner as in Example 1.

COMPARATIVE EXAMPLE 2

As Comparative Example 2, Krytox 143AC as a fluorine-based lubricant disclosed in U.S. Pat. No. 3,490,946 was applied to the same comparative disk [1]as prepared in Comparative Example 1 to form a comparative disk [2]. The results of evaluation of Example 2 and Comparative Example 2 are given in Table 2.

TABLE 2

|  | Total turn number until the coated film is damaged |
|---|---|
| Example 2 | 13,500 |
| Comparative Example 2 | 2,000 |

As is obvious from Table 2, a magnetic recording medium of Example 2 according to the present invention has a large total turn number until the organic thin film layer is damaged and thus has an excellent sliding durability, as compared with Comparative Example 2.

EXAMPLE 3

A 5.25-inch disk substrate was prepared in the same manner as in Example 1.

Separately, 0.7 g of one of eight fluorine-based lubricants shown in Table 3, 4.4 g of epoxy resin EP-1004 (trademark of a product made by E.I. DuPont), 3.0 g of phenol resin (Maruka Lyncur, trademark of a product made by Maruzen Sekiyu Kagaku K.K., Japan) and 0.04 g of triethylaminotetraphenyl borate (TEA-K, trademark of a product made by Hokko Kagaku Kogyo K.K., Japan) were dissolved in a solution mixture of 1,350 g of methylethylketone and 150 g of n-butylcellosolve acetate to (trademark of a product made by Nippon Aerosil K.K., Japan) was added to the solutions [III]and the mixture was stirred sufficiently in a homogenizer at 15,000 rpm for 10 minutes to prepare a solution [IV].

TABLE 3

| Lubricant No. | Structure of Lubricant |
|---|---|
| 1 | 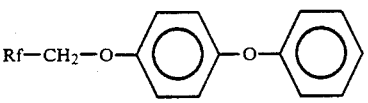 Rf—CH₂—O—⌬—O—⌬ |
| 2 | 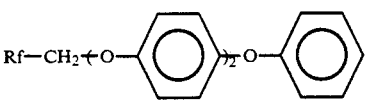 Rf—CH₂(—O—⌬)₂—O—⌬ |
| 3 | 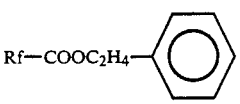 Rf—COOC₂H₄—⌬ |
| 4 | 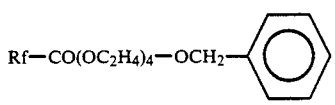 Rf—CO(OC₂H₄)₄—OCH₂—⌬ |
| 5 | 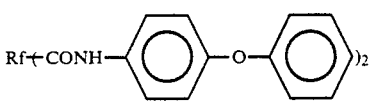 Rf(—CONH—⌬—O—⌬)₂ |
| 6 | 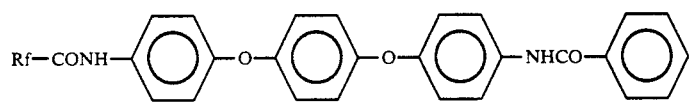 Rf—CONH—⌬—O—⌬—O—⌬—NHCO—⌬ |
| 7 | 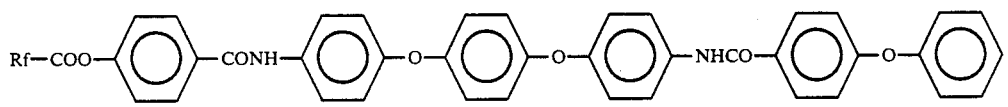 Rf—COO—⌬—CONH—⌬—O—⌬—O—⌬—NHCO—⌬—O—⌬ |
| 8 | 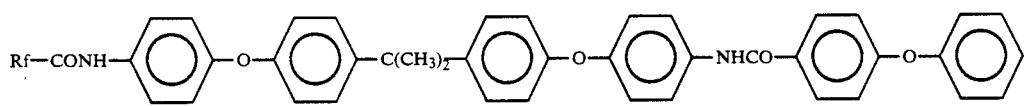 Rf—CONH—⌬—O—⌬—C(CH₃)₂—⌬—O—⌬—NHCO—⌬—O—⌬ |

Note:
In the formula Rf is $F[CF(CF_3)-CF_2O]_n CF(CF_3)-$, or $-[CF(CF_3)-CF_2O]_n CF(CF_3)-$, wherein n is 14 on average.

Then, the solution [IV] was applied to the disk substrate by a spin coater set to turn at 2,500 rpm to form a film to a thickness of 30–50 nm. After the formation of the film, the film was subjected to preheating at 80° C. for 30 minutes and then cured by heating at 230° C. for one hour to prepare a disk [3].

The sliding durability of the thus obtained disk [3] was evaluated in the same manner as in Example 1 by a spherical slider tester.

The results of evaluation are given in Table 4 together with the result of Comparative Example 2.

TABLE 4

| Lubricant No. | Total turn number until coated film is damaged |
|---|---|
| 1 | 20,000 |
| 2 | 5,000 |
| 3 | 130,000 |
| 4 | 40,000 |
| 5 | >200,000 |
| 6 | >200,000 |
| 7 | >200,000 |
| 8 | 120,000 |
| Comparative Example 2 | 2,000 |

As is obvious from Table 4, a magnetic recording medium of Example 3 according to the present invention has a large total turn number until the organic thin film layer is damaged and thus has an excellent sliding durability, as compared with Comparative Example 2.

EXAMPLE 4

A disk [1] was prepared in the same manner as in Example 1.

Separately, a magnetic head of Mn-Zn ferrite was immersed in the same solution [III] prepared in Example 3 and then gently picked up therefrom to form a thin lubricant film on the surface of the magnetic head. Then, the thin lubricant film was preheated at 80° C. for 30 minutes and then cured by heating at 230° C. for one hour.

The thus obtained disk and magnetic head were mounted on a disk drive to carry out an actual operation test. The wearing state of the disk was investigated by setting a floating spacing of the magnetic head to 0.15 μm, a relative speed of the magnetic head and disk to 10 m/sec., a head load time to a duration of 30 seconds and a non-head load time to a duration of 30 seconds. Total number of sliding contacts until a wearing damage became observable was defined as durability.

COMPARATIVE EXAMPLE 3

A combination of the disk [1] and a non-coated Mn-Zn head was used in the same actual test as in Example 4. The results of Example 4 and Comparative Example 3 are shown in Table 5.

TABLE 5

|  | Total turn number until the coated was damaged |
| --- | --- |
| Example 4 | >30,000 |
| Comparative Example 3 | 600 |

As is obvious from Table 5, a combination of a magnetic recording medium and a head of Example 4 according to the present invention has a large number of sliding contacts until a wearing damage of the disk becomes observable and thus has an excellent sliding durability, as compared with Comparative Example 3.

As is obvious from the foregoing, a magnetic recording medium and a magnetic head according to the present invention have an excellent sliding durability, and thus can improve the reliability of a magnetic recording apparatus using the magnetic recording medium and the magnetic head of the present invention.

EXAMPLE 5

Disk substrates and a solution [I] were prepared in the same manner as in Example 1. Then, 0.001 g of an inorganic filler, Aerosil-200 (trademark of product made by Nihon Aerosil K.K., Japan), having an average particle size of 12 nm without surface treatment with an alkylsilane was added to the solution [I], and 0.7 g of one of eight fluorine-containing lubricants shown in Table 3 were added thereto, and the resulting mixture was treated in the same manner as in Example 1. In this manner, eight solutions [V], each containing one of eight fluorine-containing lubricants were prepared.

Then, a film was formed by applying one of the eight solutions [V] to the surface of the disk substrate in the same manner as in Example 1 and preheated at 80° C. for 30 minutes and then heat cured at 230° C. for one hour. In this manner, eight disks [4] were prepared.

The filler in the films of the thus prepared disks [4] was dispersed substantially as primary particles. The films were homogeneous and had a film thickness of 30 to 50 nm.

Sliding durability of the disks [4] was evaluated in the same manner as in Example 1, and was better than that of Comparative Example 4, which follows, as shown in Table 6.

COMPARATIVE EXAMPLE 4

Disk substrates and a solution [I] were prepared in the same manner as in Example 1. Then, 0.001 g of an inorganic filler, Aerosil-200 (trademark of product made by Nihon Aerosil K.K., Japan), having an average particles size of 12 nm without surface treatment with an alkylsilane was added to the solution, and the resulting mixture was treated in the same manner as in Example 1 to prepare solution [V'].

Then, a film was formed by applying the solution [V'] to the surface of the disk substrate in the same manner as in Example 1, preheated at 80° C. for 30 minutes and then heat cured at 230° C. for one hour to prepare a disk [4'].

The filler in the film of the thus prepared disk [4'] was dispersed not as primary particles and existed as layers in the film. Thus, the film thickness of the organic thin protective layer of the disk was largely fluctuated and was 200 to 500 nm, which was far from desired one, i.e. 30 to 50 nm. The sliding durability of the disk [4'] was evaluated in the same manner as in Example 1 and found to be poor as shown in Table 6.

TABLE 6

|  | Lubricant No. | Total turn number until coated film is damaged |
| --- | --- | --- |
| Example 5 | 1 | 15000 |
|  | 2 | 4500 |
|  | 3 | >200000 |
|  | 4 | 150000 |
|  | 5 | >200000 |
|  | 6 | >200000 |
|  | 7 | >200000 |
|  | 8 | 180000 |
| Comp. Ex. 4 | None | 100 |

What is claimed is:

1. A magnetic recording apparatus which comprises a magnetic recording medium comprising a non-magnetic substrate, a thin film magnetic layer formed on a surface of the substrate and an organic thin film protective layer formed on the magnetic layer, the organic thin film protective layer having a thickness of not more than 100 nm, containing a filler having a particle size of not more than 50 nm and containing an organic binder and a lubricant with a combined structure of perfluoropolyoxyalkylene group and non-fluorine group, or a magnetic recording medium comprising a non-magnetic substrate, a thin film magnetic layer formed on a surface of the substrate and an organic thin film protective layer formed on the magnetic layer, the organic thin film protective layer having a thickness of not more than 100 nm, containing a filler having a particle size of not more than 50 nm and containing an organic binder and a lubricant with a combined structure of perfluoropolyoxyalkylene group and non-fluorine group, a surface of the organic thin film protective layer being coated with a fluorine-based compound represented by the following general formula:

$$F(C_3F_6—I—)_x—C_2F_4—,$$

$$F(C_3F_6—O—)_x—(CF_2O)_y—(CF_2)_z—\text{or}$$

$$—(C_2F_4—O—)_y—(CF_2—CF_2—$$

wherein x, y and z are integers of 1 or more, and a magnetic head, a surface of the head being coated with a thin lubricant film, said thin lubricant thin film also containing an organic binder and a lubricant with a combined structure of perfluropolyoxyalkylene group and non-fluorine group.

2. A magnetic recording apparatus which comprises a magnetic recording medium comprising a non-magnetic substrate, a thin film magnetic layer formed on a surface of the substrate and an organic thin film protective layer formed on the magnetic layer, the organic thin film protective layer having a thickness of not more than 100 nm, containing a filler having a particle size of not more than 50 nm and containing an organic binder and a lubricant with a combined structure of perfluoropolyoxyalkylene group and non-fluorine group, or a magnetic recording medium comprising a non-magnetic substrate, a thin film magnetic layer formed on a surface of the substrate and an organic thin film protective layer formed on the magnetic layer, the organic thin film protective layer having a thickness of not more than 100 nm, containing a filler having a particle size of not more than 50 nm and containing an organic binder and a lubricant with a combined structure of perfluoropolyoxyalkylene group and non-fluorine group, a surface of the organic thin film protective layer being coated with a fluorine-based compound represented by the following general formula:

$$F(C_3F_6-I-)_x-C_2F_4-,$$

$$F(C_3F_6-O-)_x-(CF_2O)_y-(CF_2)_z-\text{ or}$$

$$-(C_2F_4-O-)_y-(CF_2-CF_2-$$

wherein x, y and z are integers of 1 or more, and a magnetic head, a surface of the head being coated with a thin lubricant film, said thin lubricant thin film also containing an organic binder and a lubricant with a combined structure of perfluropolyoxyalkylene group and non-fluorine group; said lubricant being represented by the following formula:

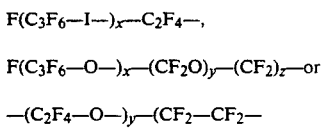

wherein Rf shows a perfluoropolyoxyalkyl group or a perfluoropolyoxyalkylene group, $R_1$ shows direct bonding, $-CH_2-$, $-CO-$ or $-CONH-$; $R_2$ shows an oxyalkylene group with 2 or 3 carbon atoms; $R_3$ shows a direct bonding, $-O-$, $-COO-$, $-CONH-$, $-NHCO-$, $-OC_pH_{2p}-$, where p is 1 or 2, or $-C(CH_3)_2-$ and $R_1$, $R_2$ and $R_3$ may differ in repetition units; m is an integer of 0 or more; n is an integer of 1 or more, and l is an integer of 1 or 2.

3. A magnetic recording apparatus which comprises a magnetic recording medium comprising a non-magnetic substrate, a thin film magnetic layer formed on a surface of the substrate and an organic thin film protective layer formed on the magnetic layer, the organic thin film protective layer having a thickness of not more than 100 nm, containing a filler having a particle size of not more than 50 nm and containing an organic binder and a lubricant with a combined structure of perfluoropolyoxyalkylene group and non-fluorine group, or a magnetic recording medium comprising a non-magnetic substrate, a thin film magnetic layer formed on a surface of the substrate and an organic thin film protective layer formed on the magnetic layer, the organic thin film protective layer having a thickness of not more than 100 nm, containing a filler having a particle size of not more than 50 nm and containing an organic binder and a lubricant with a combined structure of perfluoropolyoxyalkylene group and non-fluorine group, a surface of the organic thin film protective layer being coated with a fluorine-based compound represented by the following general formula:

$$F(C_3F_6-I-)_x-C_2F_4-,$$

$$F(C_3F_6-O-)_x-(CF_2O)_y-(CF_2)_z-\text{ or}$$

$$-(C_2F_4-O-)_y-(CF_2-CF_2-$$

wherein x, y and z are integers of 1 or more, and a magnetic head, a surface of the head being coated with a thin lubricant film, said thin lubricant thin film also containing an organic binder and a lubricant with a combined structure of perfluropolyoxyalkylene group and non-fluorine group; said lubricant being represented by the following formula:

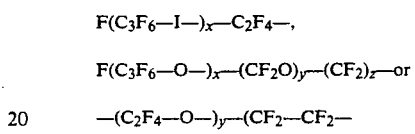

wherein Rf shows a perfluoropolyoxyalkyl group or a perfluoropolyoxylakylene group, $R_1$ shows direct bonding, $-CH_2-$, $-CO-$ or $-CONH-$; $R_2$ shows an oxyalkylene group with 2 or 3 carbon atoms; $R_3$ shows a direct bonding, $-O-$, $-COO-$, $-CONH-$, $-NHCO-$, $-OC_pH_{2p}-$, where p is 1 or 2, or $-C(CH_3)_2-$ and $R_1$, $R_2$ and $R_3$ may differ in repetition units; m is an integer of 0 or more; n is an integer of 1 or more, and l is an integer of 1 or 2; said thin lubricant film also containing a filler having a particle size of not more than 50 nm.

* * * * *